United States Patent [19]

Abe et al.

[11] Patent Number: 5,693,214

[45] Date of Patent: Dec. 2, 1997

[54] APPARATUS FOR AND METHOD OF SEPARATION TO WATER AND COLLOIDAL PARTICLES BY AGGLOMERATION

[75] Inventors: Naoki Abe, Okazaki; Fumio Kawahara, Aichi-ken; Takao Ohara, Toyota, all of Japan

[73] Assignees: Toyota Jidosha Kabushiki Kaisha; MEC International Corp., both of Aichi-ken, Japan

[21] Appl. No.: 770,258

[22] Filed: Dec. 20, 1996

[30] Foreign Application Priority Data

Dec. 21, 1995 [JP] Japan .................. 7-333440

[51] Int. Cl.$^6$ .................................................. C02F 1/463
[52] U.S. Cl. .................. 205/742; 204/565; 204/571; 204/573; 204/242; 204/660
[58] Field of Search .................. 205/742; 204/565, 204/571, 573, 242, 660

[56] References Cited

U.S. PATENT DOCUMENTS 5,338,421   8/1994   Abe et al. .................. 204/186

FOREIGN PATENT DOCUMENTS

| 0 582 314 A | 8/1993 | European Pat. Off. . |
| A-7-68102 | 3/1995 | Japan . |
| 860806 | 9/1981 | U.S.S.R. .................. 204/565 |
| 374 473 | 12/1930 | United Kingdom . |

OTHER PUBLICATIONS

Chemie–Ingenieu–Technik, vol. 62, No. 7, Jul. 1990, Weinheim, DE, pp. 525–530.

*Primary Examiner*—Arun S. Prasge
*Attorney, Agent, or Firm*—Oliff & Berridge

[57] ABSTRACT

An apparatus for separating an aqueous colloidal solution into water and agglomerate of colloidal particles by applying a high frequency voltage to the aqueous colloidal solution comprises a tank accommodating the aqueous colloidal solution, and at least one pair of electrodes disposed in the tank. The electrodes is configured such that lines of electric force are locally concentrated when the voltage is applied to said solution.

4 Claims, 6 Drawing Sheets

| SAMPLING TIME EXPERIMENTAL SUBJECT | 0H | 1H | 3H | 5H | 8H | 24H | OIL CONTENT RECOVERY AMOUNT(cc) |
|---|---|---|---|---|---|---|---|
| APPARATUS 2 | 8100 | — | — | 5100 | — | 1800 | 500 (AGGLOMERATION 450cc) |
| APPARATUS 22 | 7500 | — | — | 6300 | — | 2100 | 700 (AGGLOMERATION 650cc) |
| CONVENTIONAL APPARATUS | 7500 | — | — | 7300 | — | 6500 | 250 (AGGLOMERATION 20cc) |

| PIN LENGTH L [mm] | 5 | 12 | 19 | 26 | 33 | 40 | 47 |
|---|---|---|---|---|---|---|---|
| PIN SURFACE AREA [mm²] | 56 π | 112 π | 168 π | 224 π | 280 π | 336 π | 392 π |
| CURRENT VALUE [A] | 2.0 | 3.1 | 3.95 | 4.78 | 5.4 | 5.92 | 6.4 |

5,693,214

APPARATUS FOR AND METHOD OF SEPARATION TO WATER AND COLLOIDAL PARTICLES BY AGGLOMERATION

BACKGROUND OF THE INVENTION

1. Field of the Invention

This invention relates to an apparatus for and a method of separating water and agglomerate of colloidal particles in an aqueous colloidal solution with colloidal particles dispersed in liquid mainly composed of water, such as alkali washing liquid with oil dispersed in water in the form of oil-drop-in-water emulsified particles in water. By the term "colloidal particles" is meant either or both of liquid particles (i.e., emulsified particles) and solid particles (i.e., hydrophobic colloidal particles). By the term "agglomeration" is meant gathering of particles into a greater particle. Where colloidal particles are dispersed in an aqueous solution, by the term "separation to water and colloidal particles" is meant separation to aqueous solution and agglomerate of colloidal particles.

2. Description of the Prior Art

U.S. Pat. No. 5,338,421 and Japanese Laid-Open Patent Publication No. 7-68102 disclose a technique of promoting agglomeration of colloidal particles by applying a voltage to an aqueous colloidal solution with colloidal particles dispersed in liquid mainly composed of water. In this technique, the colloidal particles are agglomerated by applying a high frequency voltage to the aqueous colloidal solution while practically suppressing electrolysis of water, thus permitting separation and recovery of the colloidal particles from water.

In the above conventional technique, a pair of opposing plate-like electrodes are used to apply the high frequency voltage to the solution. As shown in FIG. 6, when the voltage is applied, lines of electric force 54 generated between the plate-like electrodes 50 and 52 are evenly distributed everywhere therebetween. The higher the density of the lines of electric force is, the higher the efficiency of the colloidal-particle agglomeration becomes, thus requiring a high density of the lines of electric force to efficiently promote the agglomeration.

In order to make the density of evenly distributed lines of electric force 54 high, a high voltage is required. However, the high voltage application raises a current value, thus causing drawbacks such as shortage of power source capacity and heating of the aqueous colloidal solution.

SUMMARY OF THE INVENTION

It is, accordingly, an object of the present invention to provide an apparatus and a method in which agglomeration is efficiently promoted by densely distributing lines of electric force while suppressing electric energy.

The present invention provides an apparatus for separating an aqueous colloidal solution into water and agglomerate of colloidal particles by applying a high frequency voltage to the solution, which comprises a tank accommodating the aqueous colloidal solution and at least one pair of electrodes disposed in the tank. The electrodes are configured such that lines of electric force are locally concentrated with the voltage application. By the term "high frequency" is meant a frequency within a frequency band determined in U.S. Pat. No. 5,338,421 or a frequency slightly lower than that.

In this apparatus, the electrodes are configured such that lines of electric force may be locally concentrated when the high frequency voltage is applied to the aqueous colloidal solution accommodated in the tank. The inventors of the present invention have newly found that agglomerating efficiency is remarkably increased by thus applying the voltage to create the locally concentrated distribution of the lines of electric force. With this construction, efficient agglomeration can be performed without applying a high voltage, thus preventing a high current flow, and further, electric energy increase of the power source. Accordingly, it is possible to obtain an apparatus for efficiently promoting agglomeration of the colloidal particles while suppressing the electric energy.

Further, the present invention provides a method of separating an aqueous colloidal solution into water and agglomerate of colloidal particles by applying a high frequency voltage to the solution, which comprises the steps of accommodating the aqueous colloidal solution in a tank, and applying a high frequency voltage to said aqueous colloidal solution such that lines of electric force are made locally concentrated when the voltage is applied to the solution.

By creating a distribution such that lines of electric force are locally concentrated, the agglomerating efficiency is remarkably increased. With this method, the efficient agglomeration can be performed without applying a high voltage, thus preventing a high current flow, and further, electric energy increase of the power source. Accordingly, it is possible to obtain a method of efficiently promoting the agglomeration of the colloidal particles while suppressing electric energy.

The present invention will be more fully understood from the following detailed description and appended claims when taken with the accompanying drawings.

DETAILED DESCRIPTION OF THE PREFERRED EMBODIMENTS

An embodiment of the present invention will now be described with reference to FIGS. 1(A) to 5(B).

Figure 1A:
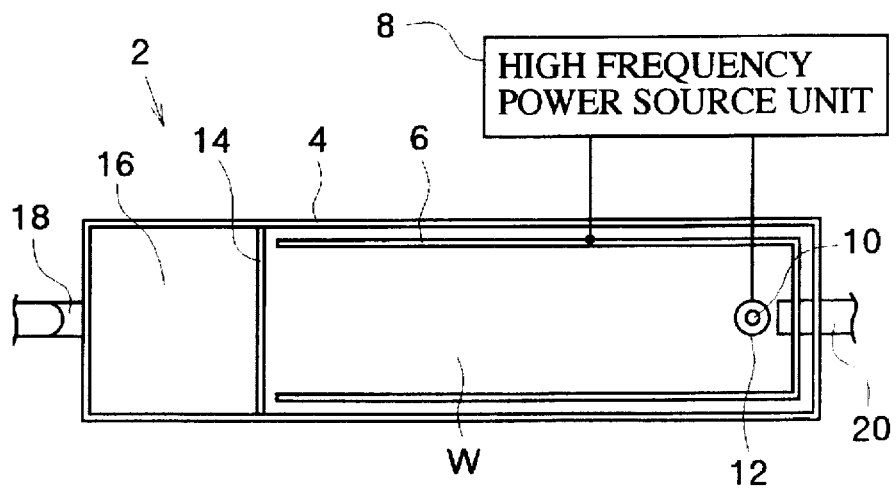
FIG. 1(A) is a plan view showing an overall construction of a first embodiment of the apparatus for separation by agglomeration.
Figure 1B:
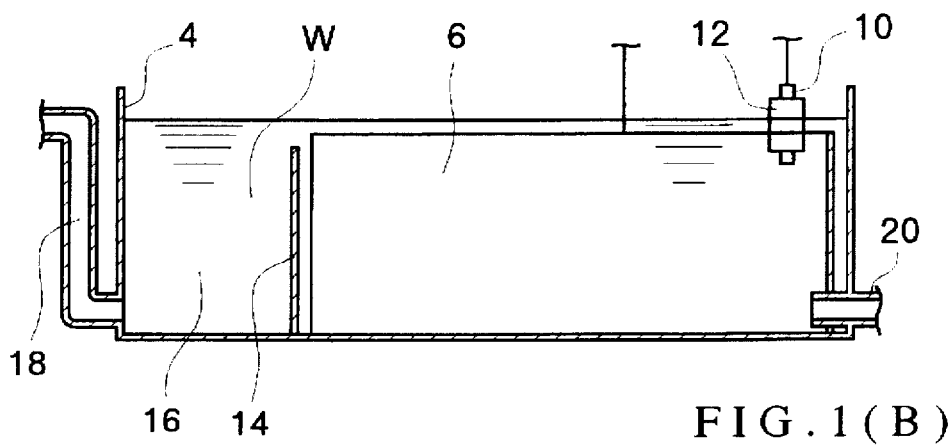
FIG. 1(B) is a vertical sectional view of the apparatus of FIG. 1(A)
Figure 1C:
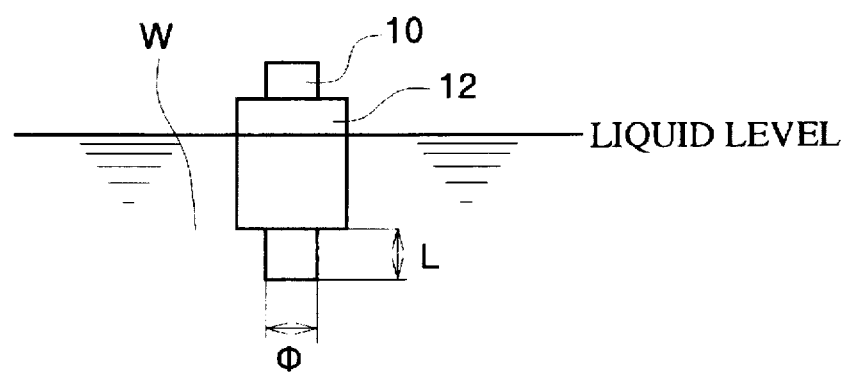
FIG. 1(C) is a partly enlarged view of FIG. 1(B).

As shown in FIG. 1(A), the apparatus 2 of the first embodiment comprises an aqueous colloidal solution to be separation-processed by agglomeration (hereinafter referred to as "process liquid W"), a tank 4 accommodating the process liquid W. The tank 4 is provided therein with a box-type electrode 6 of substantially U-shaped configuration when viewed from the upper side thereof. As shown in FIGS. 1(B) and 1(C), a pin electrode 10 is disposed inside the box-like electrode 6 to be immersed into the process liquid W from the level thereof.

The outer peripheral surface of the pin electrode 10 is partly covered with an insulating material 12 (polypropylene is used in the embodiment). The length of the pin electrode 10 in contact with the process liquid W is shown as L. L is set to 5 mm, and the diameter Φ of the pin electrode 10 is 8 mm in this embodiment.

The box-like electrode 6 and the pin electrode 10 are connected to a high frequency power source unit 8 for applying a high frequency voltage. The high frequency power source unit 8 used in this embodiment is the same one as shown in U.S. Pat. No. 5,338,421. However, the frequency actually used in this embodiment is lower than that in U.S. Pat. No. 5,338,421.

A partitioning plate 14 with a short height rises inside the tank 4 from the bottom thereof so that an overflow tank 16 may be formed on the left side of the partitioning plate 14. The process liquid W after separation flows over the partitioning plate 14 into the overflow tank 16 from a side on which the box-like electrode 6 and the pin electrode 10 are disposed.

As shown in FIG. 1(B), a lower part on a side surface of the overflow tank 16 is connected to an outlet pipe 18 which rises from the lower part to the liquid level for flowing out the process liquid W overflown from the liquid level.

On the other hand, a lower part on a side surface of the tank 4 opposed to the overflow tank 16 is connected to an inlet pipe 20 whose end penetrates the box-like electrode 6. The process liquid W flows into the tank 4 from the inlet pipe 20 which is connectable to the outlet pipe 18 via a circulating pump (not shown). The outlet pipe 18 and the inlet pipe 20 are connected via the circulating pump during the process of separation by agglomeration, the process liquid W is processed while circulating a route through the inlet pipe 20 → the tank 4 → the outlet pipe 18 →the circulating pump →the inlet pipe 20.

Figure 2:
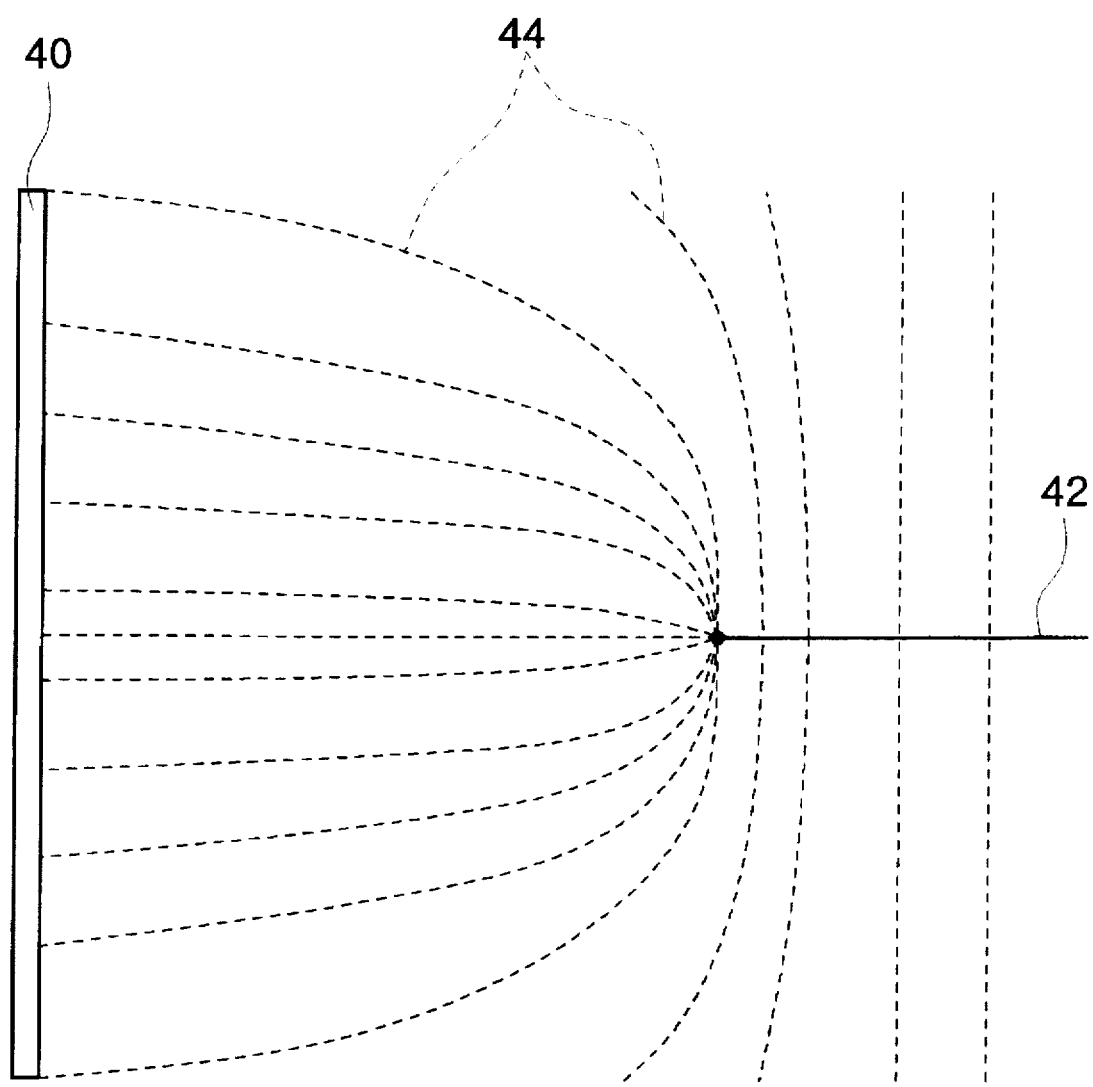
FIG. 2 is a chart showing a distribution of lines of electric force in the apparatus of FIG. 1(A).

With reference to FIG. 2, a distribution of lines of electric force will now be described in a case when a voltage is applied by using the pin electrode 10.

FIG. 2 shows an ideal distribution of lines of electric force generated between a plate electrode 40 and an opposing rod-like electrode 42. By thus applying the voltage in a state in which the plate electrode 40 is opposed to the rod-like electrode 42, the lines of electric force 44 are concentrated on a part adjacent to an end of the rod-like electrode 42.

Accordingly, in the separation apparatus 2 shown in FIG. 1, by a high frequency voltage application from the high frequency power source unit 8, the lines of electric force are concentratedly distributed in the vicinity of the pin electrode 10. As will be described hereinafter with reference to FIGS. 4(A) and 4(B), agglomerating efficiency is remarkably increased by thus distributing the lines of electric force to be concentrated to a part. As a result, without applying the high voltage, agglomeration of the colloidal particles from the process liquid W is efficiently performed.

Thus, the pin electrode 10 plays a role as the rod-like electrode of the present invention. Thus, it is possible to obtain a separation apparatus which efficiently promotes agglomeration while suppressing the electric energy.

Figure 3A:
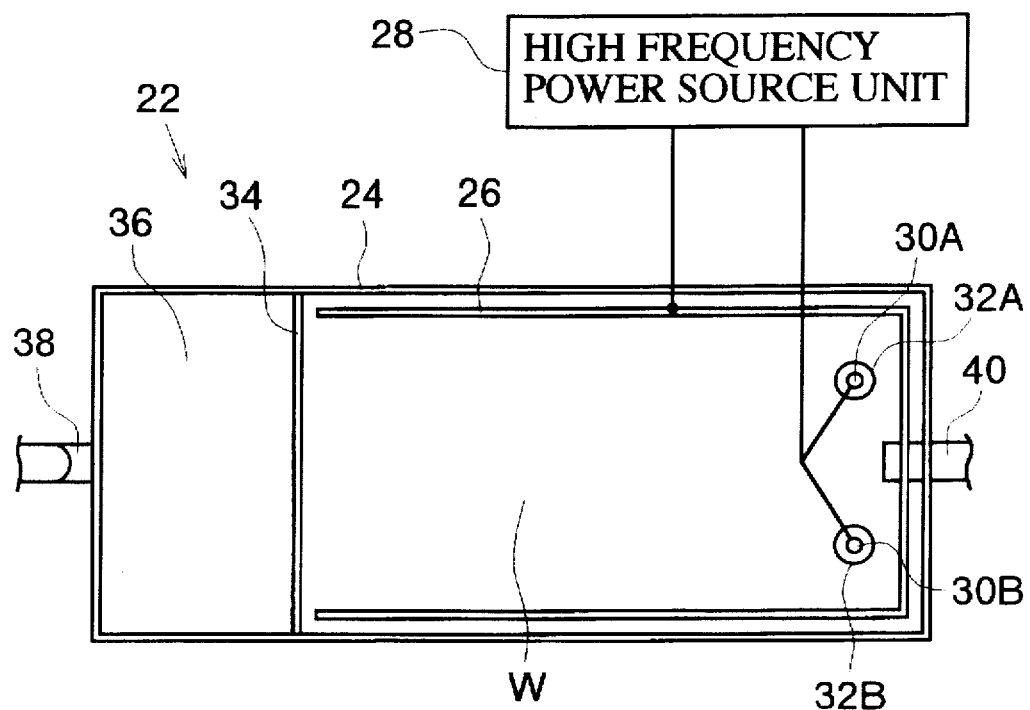
FIG. 3(A) is a plan view showing an overall construction of a second embodiment of the apparatus for separation by agglomeration.

Another embodiment of the present invention will now be described with reference to FIGS. 3(A) and 3(B). As with the apparatus 2 of the first embodiment, an apparatus 22 for separation by agglomeration comprises a tank 24 accommodating the process liquid W and a box-type electrode 26 provided in the tank 24 and having a substantially U-shaped configuration when viewed from the upper side thereof. Inside the box-type electrode 26, pin electrodes 30A and 30B are disposed to be immersed into the process liquid W from the level thereof in the same manner as shown in FIG. 1(C).

The outer peripheral surfaces of the pin electrode 30A and 30B are partly covered with polypropylene 32A and 32B as an insulating material. The lengths of the pin electrodes 30A and 30B in contact with the process liquid W are 5 mm, and the diameters thereof are 8 mm each being the same as that of the apparatus 2.

The box-like electrode 6 and the pin electrode 10 are connected to a high frequency power source unit 8 for applying a high frequency voltage. The high frequency power source unit 8 used in this embodiment is the same one as shown in U.S. Pat. No. 5,338,421. However, the frequency actually used in this embodiment is lower than that in U.S. Pat. No. 5,338,421.

A partitioning plate 34 with a short height rises inside the tank 24 from the bottom thereof so that an overflow tank 36 may be formed on the left side of the partitioning plate 34. The process liquid W after separation flows over the partitioning plate 34 into the overflow tank 36 from a side on which the box-type electrode 26 and the pin electrodes 30A and 30B are disposed.

Figure 3B:
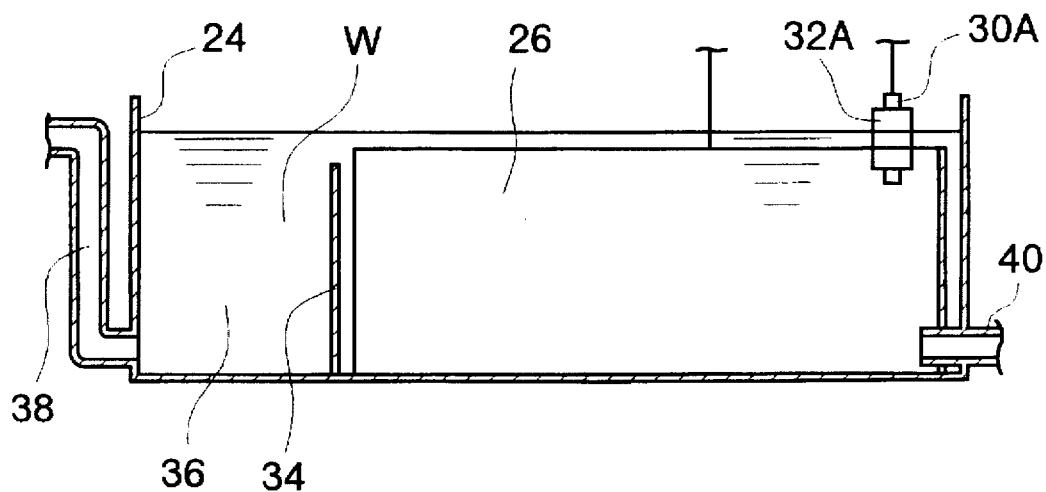
FIG. 3(B) is a vertical sectional view of the apparatus of FIG. 3(A)

As shown in FIG. 3(B), a lower part on a side surface of the overflow tank 36 is connected to an outlet pipe 38 which rises from the lower part to the liquid level for flowing out the process liquid W overflown from the liquid level.

On the other hand, a lower part on a side surface of the tank 24 opposed to the overflow tank 36 is connected to an inlet pipe 40 whose end penetrates the box-like electrode 26. The process liquid W flows into the tank 24 from the inlet pipe 40 which is connectable to the outlet pipe 38 via a circulating pump (not shown). The outlet pipe 38 and the inlet pipe 40 are connected via the circulating pump during the process of separation by agglomeration, the process liquid W is processed while circulating a route through the inlet pipe 40 → the tank 24 → the outlet pipe 38 →the circulating pump →the inlet pipe 40.

Figures 4A, 4B:
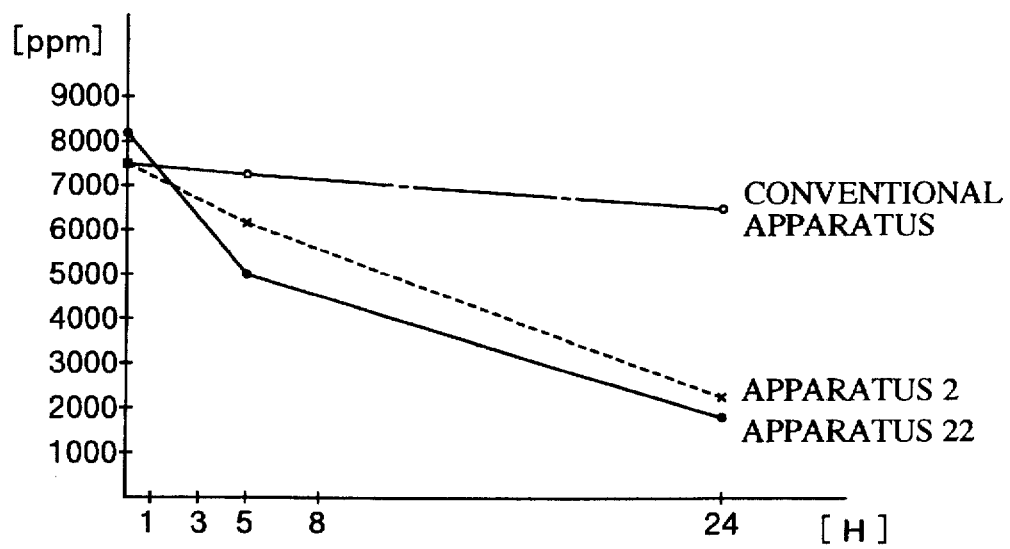
FIGS. 4(A) and 4(B) are a table and a chart showing the result of experiment comparing the apparatus of the present invention to a conventional one.

Shown in FIGS. 4(A) and 4(B) are the result of an actual experiment of the separation by agglomeration conducted by using the apparatuses 2 and 22 having the constructions as described above.

Each of the high frequency power source units 8 and 28 of the embodiments applies a high frequency voltage to each electrode in the form of a rectangular wave shaped from a sine wave by a waveform shaper.

The experiment was conducted, for each of the separation apparatuses 2 and 22 of the embodiments and a conventional apparatus of parallel-plate-type electrodes, under the condition that the efficient voltage (Vrms) of the original sine-wave-high-frequency voltage was about 70 V and that the rectangular-wave-high-frequency voltage practically applied to the electrodes was 90 V. The liquid temperature was 53° C. when starting and ending the experiment.

FIG. 4(A) is a table showing the result of a separation experiment conducted under the above-described condition. The value in the table shows condensation in ppm of the extract extracted by N-hexane from the process liquid W at each elapsed time. The process liquid W used is composed of water mixed with 3% detergent and 1% oil. Sampling of the process liquid W is performed by taking out in part the circulating process liquid W flown out from the outlet pipes 18 and 38.

FIG. 4(B) is a graph showing condensation variation with time of the extract from the process liquid W by N-hexane where the abscissas is taken for the experiment time and the ordinate is taken for the extract concentration. The result of the experiment is shown by a solid line for the apparatus 2, a broken line for the apparatus 22 and an alternate long and short line for a conventional apparatus.

As shown in FIGS. 4(A) and 4(B), oil removal is remarkably efficiently performed by the apparatuses 2 and 22 compared with the conventional apparatus of parallel-plate-type electrode.

Particularly, increase of agglomerating efficiency yielded by the pin electrode is best understood when contrasting the conventional apparatus and the apparatus 22 whose tanks have the same volume.

The relation between the current value and the length of the conductive part of the pin electrode will now be described with reference to FIGS. 1(A) to 1(C), 5(A) and 5(B).

Figures 5A, 5B:
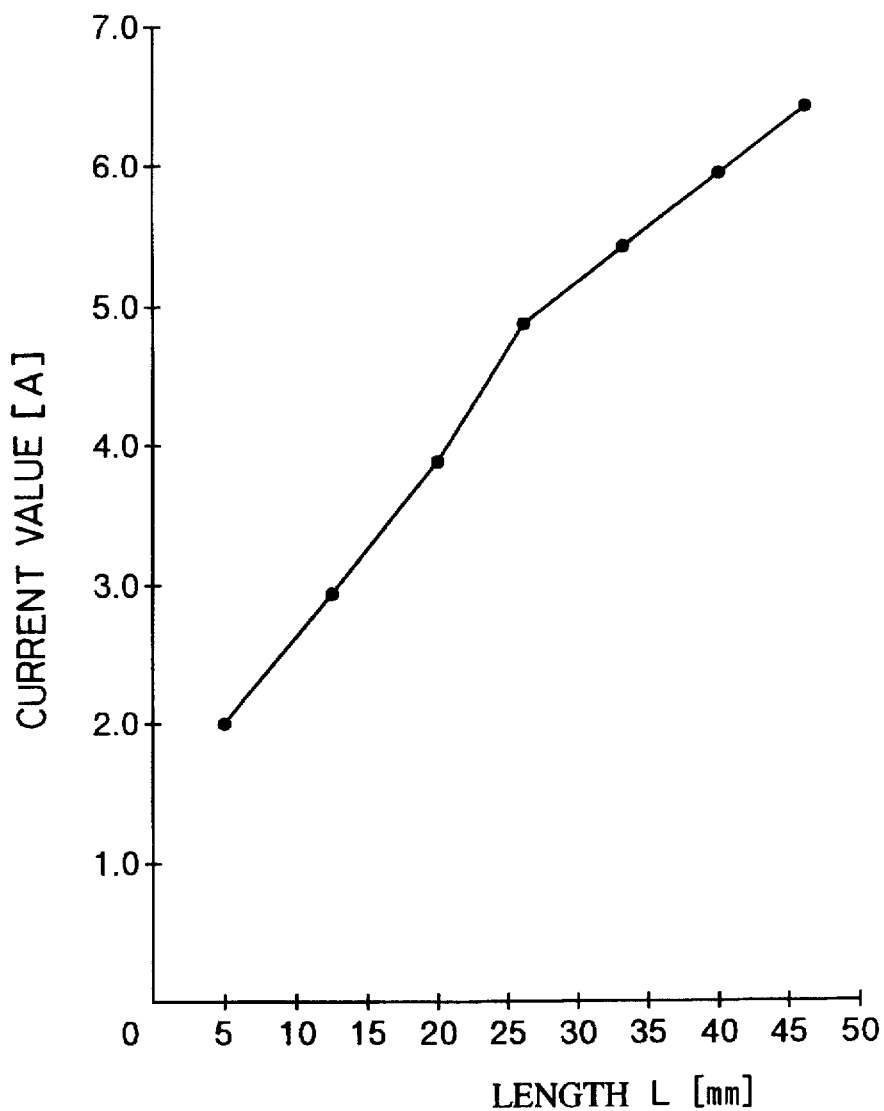
FIGS. 5(A) and 5(B) are a table and a chart showing the relation between the length of a pin electrode and the current value.
Figure 6:
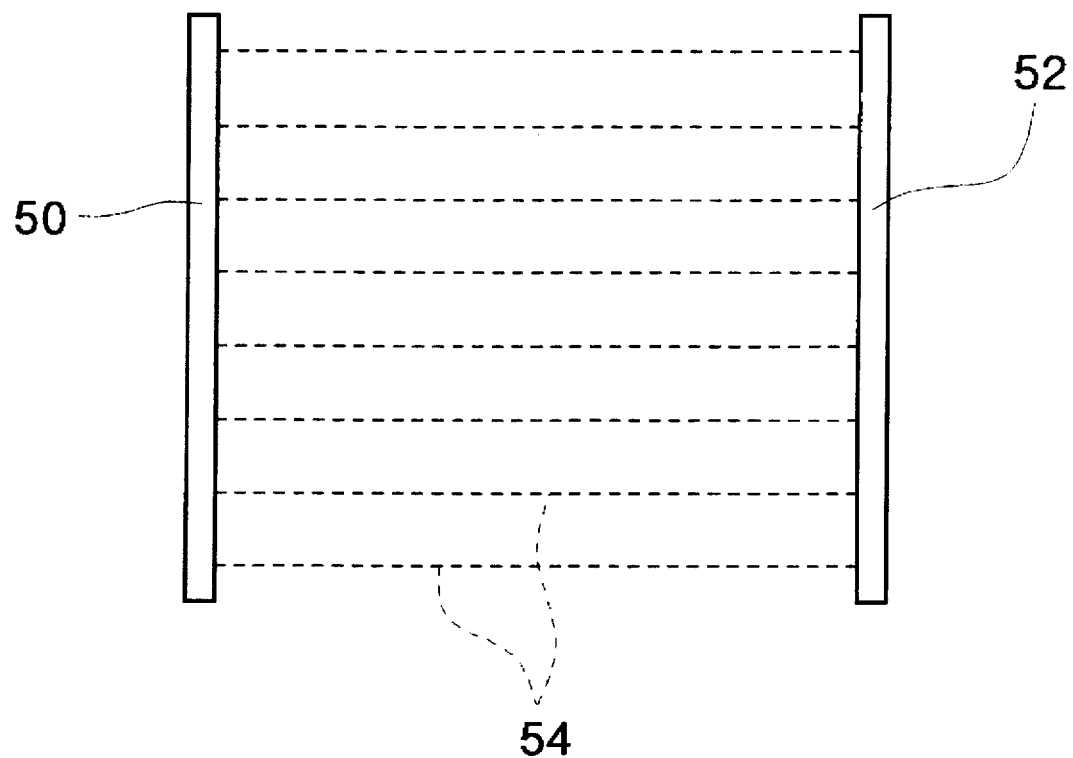
FIG. 6 is a chart showing the distribution of lines of electric force of a conventional apparatus for separation.

In FIG. 1(C), L shows the length of the conductive part of the pin electrode in contact with the process liquid W. FIGS. 5(A) and 5(B) are, respectively, a table and a graph showing the experimental result with the apparatus 2 of the current values measured with variation of the length L when a voltage (rectangular-wave-high-frequency-voltage of 90 V) is applied. Process liquid W used in this experiment was different from that used in the experiment of FIGS. 4(A) and 4(B).

As shown in FIGS. 5(A) and 5(B), the longer length L of the conductive part of the pin electrode leads to the greater current value when the high-frequency-voltage is applied. Conversely speaking, it will be seen that the shortened length L permits the suppression of the current flowing when the high-frequency-voltage is applied. By thus suppressing the current value, power source capacity can be made smaller in this case even with the same voltage application, thus reducing product cost and running cost thereof. Further, in the examples using the power sources of the same capacity, this construction permits application of the higher voltage, thus more increasing the efficiency of separation by agglomeration.

However, if the length of the conductive part of the electrode is too short, the concentration of the lines of the electric force is excessively intensified, thus causing a phenomenon to melt the electrode itself.

Accordingly, it is preferable to determine the length L of the conductive part and the diameter Φ of the electrode, depending on the property of the process liquid W and the material of the electrode, within range that self-melting or self-corroding of the electrode is not yielded. In this embodiment as described above, it was determined that L=5 mm, and Φ=8 mm.

In these embodiments described above, the conductive parts of the pin electrodes 10, 30A and 30B are located near the surface of the process liquid W so that the lines of electric force are concentrated on a part adjacent to the liquid level where the colloidal particles or oil is densely distributed, thus obtaining a unique advantage of efficient separation by agglomeration of the colloidal particles.

In these embodiments, the apparatuses are constructed such that the pin electrodes 10, 30A and 30B are disposed inside the substantially U-shaped box-type electrodes 6 and 26. However, other constructions in which a plate electrode or the like is opposed to a pin electrode or in which both the electrodes are pin electrodes may be used.

Further, in these embodiments, the pin electrodes 10, 30A and 30B are immersed downward from the liquid level of the process liquid W. However, the pin electrode may be immersed transversely through a side wall of the tank into the process liquid W, or immersed from the bottom of the tank toward the upper side thereof. Further, in these embodiments, pin electrodes of a rod-like shape are used for concentrating lines of electric force, but other shape may be used as long as it is possible to concentrate the lines of electric force.

In these embodiments, a rectangular-wave-high-frequency-voltage is used as voltage to be applied to the electrodes, but a sine-wave-voltage may be applied. As described above, current flow can be suppressed in these embodiments so that a lower frequency than that determined in U.S. Pat. No. 5,338,421 can be used. Voltage to be applied is not limited to a high frequency voltage.

Other structure, shape, size, material, the number, and connection related parts of the separation apparatus and the contents of other steps of the separating method are not limited to the embodiments While the invention has been described with reference to preferred embodiments thereof, it is to be understood that modifications or variations may be easily made without departing from the scope of the present invention which is defined by the appended claims.

What is claimed is:

1. An apparatus for separating an aqueous colloidal solution into water and agglomerate of colloidal particles by applying a high frequency voltage to said aqueous colloidal solution, the apparatus comprising:

a tank accommodating said aqueous colloidal solution; and at least one pair of electrodes disposed in said tank;

means for applying a high frequency voltage;

said electrodes being configured such that lines of electric force are locally concentrated when said voltage is applied to said solution.

2. The apparatus as defined in claim 1, wherein at least one of said pair of electrodes has a rod-like shape.

3. The apparatus as defined in claim 2, wherein the length of a conductive part of said rod-like electrode is determined depending on the property of said aqueous colloidal solution by covering said electrode with an insulator.

4. A method of separating an aqueous colloidal solution into water and agglomerate of colloidal particles by applying a high frequency voltage to the solution, the method comprising the steps of:

accommodating the aqueous colloidal solution in a tank;

providing at least one pair of electrodes disposed in said tank, said electrodes being configured such that lines of electric force are locally concentrated when said voltage is applied to said solution; and applying a high frequency voltage.

* * * * *